(12) United States Patent
Kugler

(10) Patent No.: US 6,172,637 B1
(45) Date of Patent: Jan. 9, 2001

(54) METHOD AND APPARATUS FOR DECODING A READ CHANNEL SIGNAL

(75) Inventor: Patrick Kugler, Campbell, CA (US)

(73) Assignee: Oak Technology, Inc., Sunnyvale, CA (US)

( * ) Notice: Under 35 U.S.C. 154(b), the term of this patent shall be extended for 0 days.

(21) Appl. No.: 09/332,536

(22) Filed: Jun. 14, 1999

(51) Int. Cl.⁷ ..................................................... H03M 1/34

(52) U.S. Cl. ........................... 341/158; 341/118; 341/120

(58) Field of Search ................................... 341/118, 120, 341/143, 155, 158

(56) References Cited

U.S. PATENT DOCUMENTS

| | | | |
|---|---|---|---|
| 5,220,546 | 6/1993 | Fennema | 369/32 |
| 5,535,327 | 7/1996 | Verinsky et al. | 395/182.03 |
| 5,581,715 | 12/1996 | Verinsky et al. | 395/309 |
| 5,652,586 * | 7/1997 | Chuh et al. | 341/172 |
| 5,815,530 * | 9/1998 | Hirai | 375/247 |
| 5,870,363 | 2/1999 | Sun et al. | 369/50 |
| 5,920,273 * | 7/1999 | Hirano | 341/144 |

OTHER PUBLICATIONS

"The Compact Disk Handbook", 2ⁿᵈ edition, by Ken C. Pohlmann, pp. 86–89 (1992).
"Philips Consumer Electronics–Compact Disk: *Nothing is Impossible*", http://www–us.sv.philips.com/newtech/cd.html, pp. 1–26 (May 12, 1999).
"Compact Disc Pickup Designs", by Cho Leung Chan, http://www.ee.washington.edu/conselec/W94/cho/chocd.htm, pp. 1–6 (May 12, 1999).
"GIF Image 669×459 pixels", http://www.ee.washington.edu/conselec/W94/cho/cho03.gif, (May 12, 1999).
"OTI–9780: *Preliminary Product Brief*", http://www.oaktech.com/briefs/9780.htm, pp. 1–2 (Jul. 1998).
"OTI–9780 Product Brief: *Techinical Specifications*", http://www.oaktech.com/briefs/978tech.htm, pp. 1–2 (Mar. 12, 1999).
"OTI–975: *IDE CD Recordable/ReWritable Controller*", http://www.oaktech.com/briefs/975.htm, pp. 1–2 (Mar. 12, 1999).
"GIF Image", htt://www.oaktech.com/images/975.gif (Mar. 12, 1999).
"OTI–912: *IDE CD–ROM Controller*", http://www.oaktech.com/briefs/912.htm, pp. 1–2 (Mar. 1997).
"GIF Image", http://www.oaktech.com/images/912blok.gif, (Mar. 12, 1999).
"CD—*The Inside Story*", by Glen Baddleley, http://werple,het,au/~gnb/mac–cdis/index.html, (Jul. 7, 1998).
"CD—*The Inside Story—Part 1—General Principles*", by Glenn Baddeley, http://werple.net.au/~gnb/mac–cdis/cd.1.html, (Dec. 2, 1996).
"CD—*The Inside Story—Part 2—The Disc*", by Glenn Baddeley, http://werple.net.au/~gnb/mac–cdis/cd2.html, (Dec. 2, 1996).

(List continued on next page.)

*Primary Examiner*—Michael Tokar
*Assistant Examiner*—Anh Tran
(74) *Attorney, Agent, or Firm*—Pennie & Edmonds LLP

(57) ABSTRACT

A circuit converts an analog read channel signal to a digital data signal. A read channel error detector generates an error signal in response to an error in an analog read channel signal. In a set of parallel switches, each parallel switch is connected in series to a pullup resistor and a DC voltage source. A selected parallel switch changes state in response to the error signal so as to provide an adjusted analog read channel signal. A first input of a comparator is coupled to the set of switches, while a second input of the comparator is maintained at a reference voltage. The comparator outputs a digital data signal in response to the adjusted analog read channel signal.

18 Claims, 4 Drawing Sheets-

OTHER PUBLICATIONS

"CD—*The Inside Story—Part 3—Data Format*", by Glenn Baddeley, http://werple.net.au/~gnb/mac–cdis/cd3.html, pp. 1–2 (Dec. 2, 1996).

"CD—*The Inside Story—Part 4—Sub–code*", by Glenn Baddeley, http://werple.net.au/~gnb/mac–cdis/cd4.html, pp. 1–2 (Dec. 2, 1996).

"CD—*The Inside Story—Part 5—Laser Tracking*", by Glenn Baddeley, http://werple.net.au/~gnb/mac–cdis/cd5.html, pp. 1–4 (Dec. 2, 1996).

"CD—*The Inside Story—Part 7—Digital to Analog Conversion*", by Glenn Baddeley, http://werple.net.au/~gnb/mac–cdisvcd7.html, pp. 1–4 (Dec. 2, 1996).

"CD—*The Inside Story—Part 8—Over–sampling and Filtering*", by Glenn Baddeley, http://werple.net.au/~gnb/mac–cdis/cd8.html, pp. 1–4 (Dec. 2. 1996).

"CD—*The Inside Story—Part 9—Mythology*", by Glenn Baddeley, http://werple.net.au/~gnb/mac–cdis/cd9.html, pp. 1–2 (Dec. 2, 1996).

"CD—*The Inside Story—Postscript & References*", by Glenn Baddeley, http://werple.net.au/~gnb/mac–cdis/cdp-s.html, pp. 1–2 (Dec. 13, 1998).

"*Audio Compact Disk—An Introduction*", by Professor Kelin J. Kuhn, http://www.ee.washington.edu/conselec/CE/kuhn/cdaudoo/95x6.htm, pp. 1–7 (May 12, 1999).

"Mitsubishi <Control/ Driver IC> M56755FP Spindle Motor Driver", pp. 1–9.

"Mitsubishi <Control/Driver IC> M56754SP 4–Channel Actuator Motor Driver", pp. 1–7.

Runout Calibration for Disc Drive System, U.S. Patent Application, Ser. #08/834,607, (Filed Apr. 14, 1997).

* cited by examiner

Block Diagram of a Disk Drive System

RF Signal with Dropout

METHOD AND APPARATUS FOR DECODING A READ CHANNEL SIGNAL

BRIEF DESCRIPTION OF THE INVENTION

This invention relates generally to disk drive systems. More particularly, this invention relates to a method and apparatus for decoding a read channel signal.

BACKGROUND OF THE INVENTION

Personal computers typically connect to an optical disk drive such as a CD-ROM to read data from a compact disk. On the compact disk, data is stored in the form of pits and lands patterned in a radial track. The track is formed in one spiral line extending from the inner radius of the disk to the outer edge. A pit is a location on the disk where data has been recorded by creating a depression in the surface of the disk with respect to the lands. The lands are the areas between the pits in the tangential direction. The reflectivity of the pits is less than the reflectivity of the lands. To store audio or digital information, the length of the pits and lands are controlled according to a predefined encoding format.

When reading information from the disc, light from a laser beam is directed onto the track and the light beam is reflected back to a photo-sensor. Since the pits and lands have different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as an RF signal, that is proportional to the energy of the light in the reflected light beam.

In FIG. 1, the relationship of the RF signal to the pits and lands is shown. A smaller pit or land decreases both the period and the amplitude of the RF signal. The RF signal in the pits and lands has opposite polarity.

One encoding format used in optical disk systems is eight-to-fourteen modulation (EFM). EFM reduces errors by minimizing the number of zero-to-one and one-to-zero transitions. In other words, small pits are avoided. In EFM, the data signal includes no less than two zeros and no more than ten zeros between logical transitions at the pit edges. A zero is indicated by no change in the energy of the reflected beam for at least two clock periods. A one is indicated by a change in the energy of the reflected light beam, that is, a pit edge. Applying the EFM encoding rules, a pit or land will have a length corresponding to the amount of time for at least two and up to ten clock periods and the electronics will output a corresponding voltage as shown in FIG. 1.

The RF signal needs to be decoded into a serial digital data signal. In one circuit, to decode the analog RF signal, a comparator compares the RF signal to a reference voltage to generate a digital data signal. A bias resistor is coupled to the comparator input receiving the read channel signal to center a DC offset voltage of the read channel signal to be substantially equal to the reference voltage.

Compared to magnetic disk drives, the optical disk is much less sensitive to the effects of contamination such as dust and fingerprints. However, contamination does affect the RF signal because the reflectivity of the disk is changed in the contaminated regions. Although various error correction techniques are applied to the decoded digital data that is derived from the RF signal, these techniques are limited as to the number of errors that can be corrected.

Contamination will change the DC offset voltage of the RF signal. Since the bias resistor is fixed, the bias resistor cannot be adjusted to compensate for the changed offset voltage. Therefore, the digital data signal will have an error that may or may not be corrected.

In view of the foregoing, it would be highly desirable to provide a circuit that adjusts the DC offset of the read channel signal in response to an error in the read channel signal. Such a circuit would provide a more resiliant disk drive system by correcting for errors. In addition, integrated resistors consume expensive space on a device and a precise resistance value is difficult to achieve. Therefore, it would also be desirable that the circuit operate with external resistors. External resistors provide more precise resistance values at a reduced cost.

SUMMARY OF THE INVENTION

A circuit converts an analog read channel signal to a digital data signal. A read channel error detector generates an error signal in response to an error in the analog read channel signal. In a set of parallel switches, each parallel switch is connected in series to a pullup resistor and a DC voltage source. A selected parallel switch changes state in response to the error signal so as to provide an adjusted analog read channel signal. A comparator has a first input and a second input. The first input is coupled to the set of switches, and the second input is maintained at a reference voltage. The comparator outputs a digital data signal in response to the adjusted analog read channel signal.

In this way, by including and excluding resistors in response to the error signal, the bias voltage of the read channel signal is adjusted. The invention allows for a quick response to errors by directly coupling the error signal to a switch. In particular, when drop-outs in the data occur, the resistor is quickly switched into the circuit to reduce the offset voltage to reduce the recovery time.

In one embodiment, the circuit is implemented on an integrated circuit and the resistors are external.

In another embodiment, the circuit of the present invention is included in a disk controller.

In yet another embodiment, a method is provided to convert the analog read channel signal to a digital data signal. An error signal is generated in response to an error in the analog read channel signal. A state of at least one switch of a set of parallel switches is changed in response to the error signal to adjust the analog read channel signal so as to provide an adjusted analog read channel signal. Each parallel switch is connected to a resistor and a DC voltage source. The adjusted analog read channel signal is compared to a reference voltage to generate a digital data signal.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
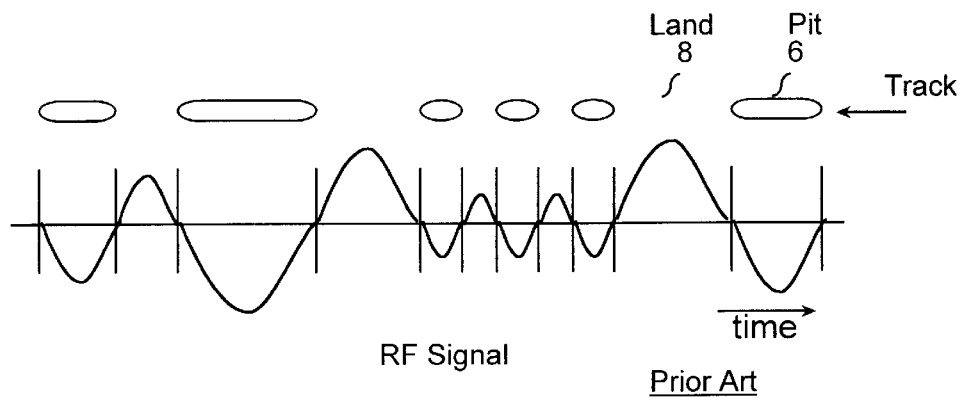
FIG. 1 illustrates the relationship between an analog RF signal and the pits and lands on a disk.
Figure 2:
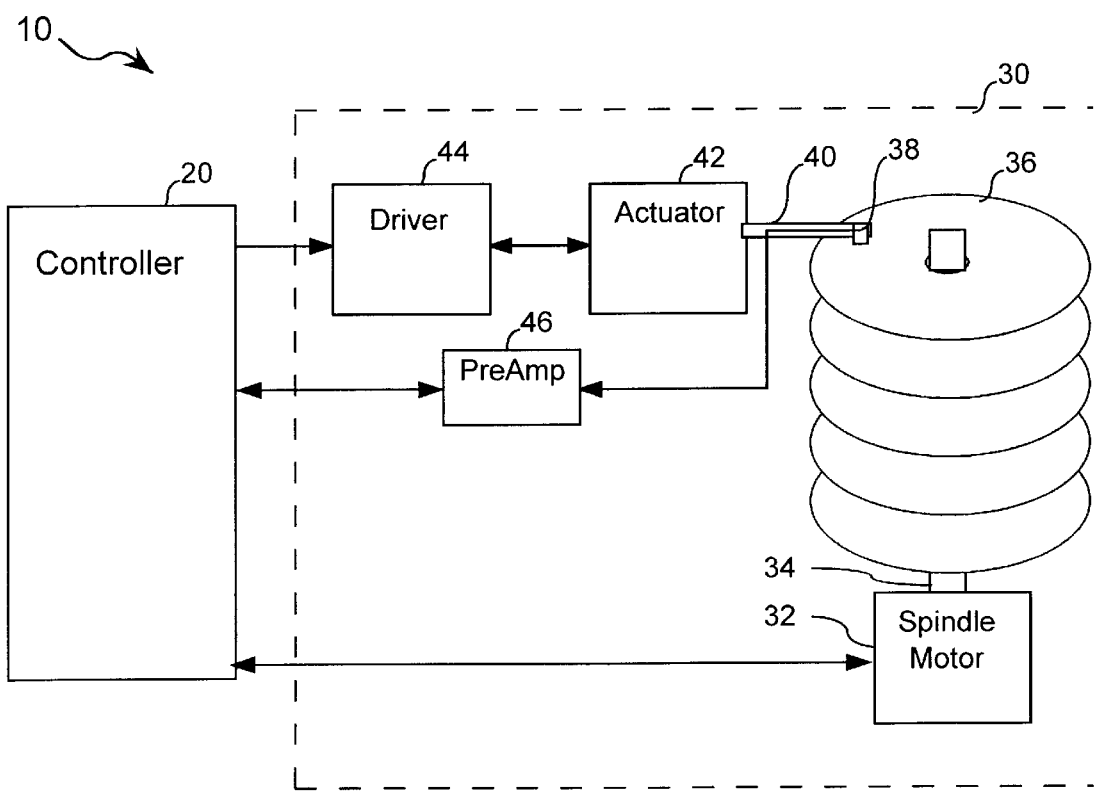
FIG. 2 illustrates a general architecture of a disk drive system in accordance with an embodiment of the present invention.

In FIG. 2, a disk drive system 10 has a controller unit 20 that connects to a disk drive 30 such as an optical disk drive. In the optical disk drive 30, a spindle motor 32 is attached to a spindle 34 which supports at least one disk 36. In response to commands from the controller unit 20, the spindle motor 32 rotates the spindle 34 and therefore the disks 36.

While the disk 36 is rotating, an optical head 38 reads information from or writes information to the disk 36. The optical head 38 is supported by an actuator arm 40 which is attached to an actuator 42. A motor driver 44 is attached to the actuator 42 to move the actuator 42 to position the head 38 with respect to a target track on the disk 36.

A preamplifier 46 receives the analog RF signal from the head 38 and outputs an analog read channel signal, as well as other signals used by the controller unit 20.

Figure 3:
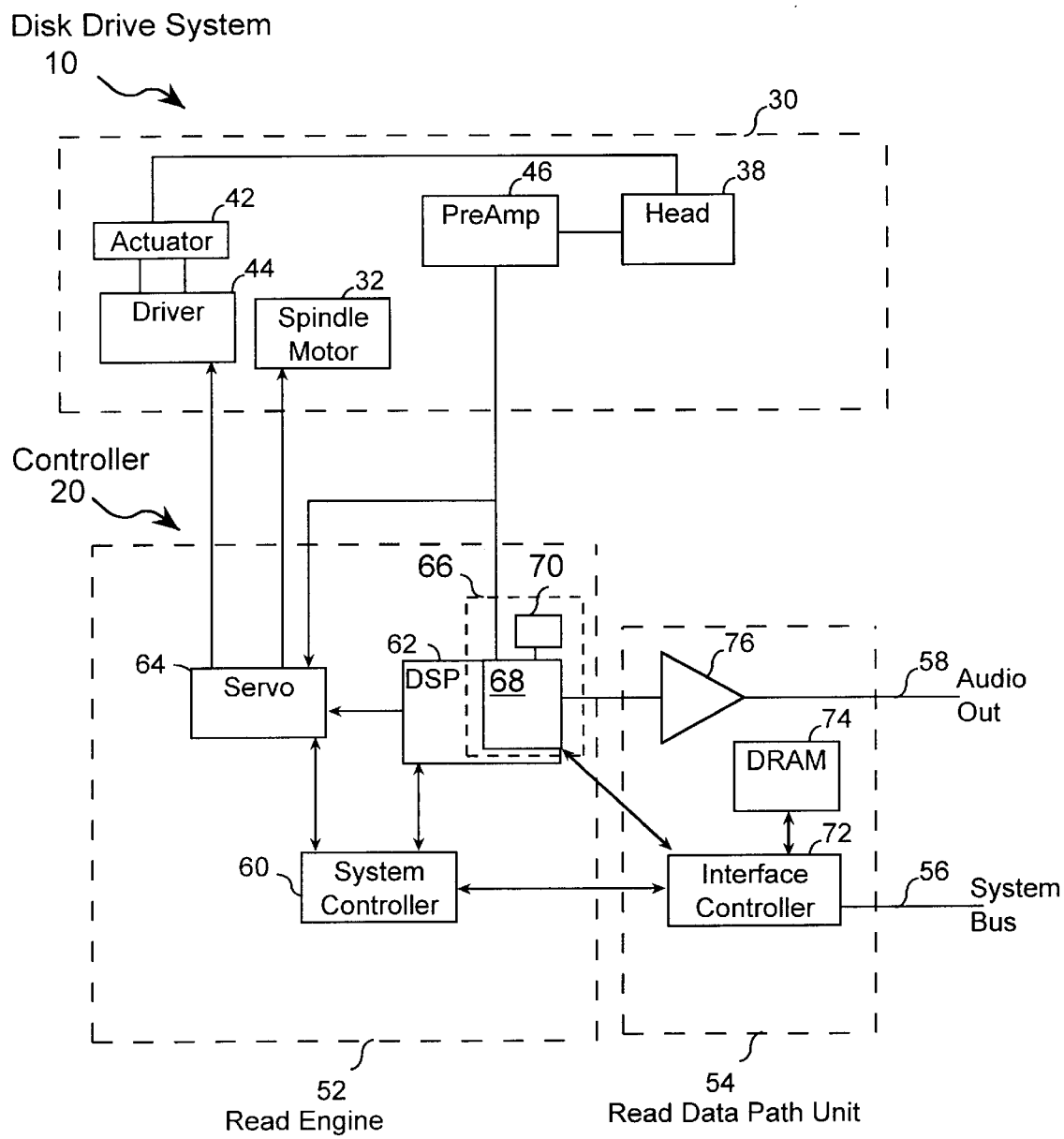
FIG. 3 illustrates a general architecture of a disk controller in accordance with an embodiment of the present invention.

FIG. 3 is a more detailed block diagram of the disk controller 20 and its associated disk drive 30. The disk controller 20 has a read engine 52 that connects to a read data path unit 54. The read engine 52 communicates directly with the disk drive 30 while the read datapath unit 54 communicates with a system bus 56 and supplies an audio signal to an audio output line 58.

The read engine 52 has a system controller 60, a digital signal processor 62 and a servo control unit 64. The system controller 60 receives commands from and sends status to a system bus 56 via the read datapath unit 54. In response to the commands from the system bus 56, the system controller 60 sends commands to and receives status information from the digital signal processor (DSP) 62 and the servo control unit 64 to read data from the disk.

The DSP 62 receives the analog read channel signal from the preamplifier 46. The analog read channel signal includes both digital data and control information. The DSP 62 processes the analog read channel signal, and outputs control signals that are used by the servo control unit 64. The DSP 62 also performs error correction on the analog read channel signal.

The servo control unit 64 positions the head 38 with respect to a target track, and then keeps the head 38 centered and focused on the target track. To do so, the servo control unit 64 receives the control signals from the DSP 62 and sends signals to the motor driver 44 and spindle motor 32 to control focusing and tracking to position the optical head 38 precisely with respect to the target track on the disk 36.

In a noteworthy aspect of the present invention, the data slicer circuit 66 receives the analog read channel signal from the pre-amplifier 46 and outputs a digital data signal. A portion 68 of the data slicer circuit 66 is formed on the DSP 62 and connects to a set of external resistors 70. The data slicer circuit 66 will be further discussed below with reference to FIG. 4.

In the datapath unit 54, the interface controller 72 receives the digital data signal from the DSP 62 in a serial stream, descrambles the data, and assembles the data into eight-bit bytes. The interface controller 72 then stores the data into a DRAM 74. The DRAM 74 acts as a buffer for the digital data from the DSP 62. The interface controller 72 also performs error detection and correction operations on the buffered data and transfers the data to the system bus 56.

To provide the audio output, a digital-to-analog converter (DAC) 76 receives the digital data signal from the DSP 62 and outputs an audio signal on the audio output line 58.

Figure 4:
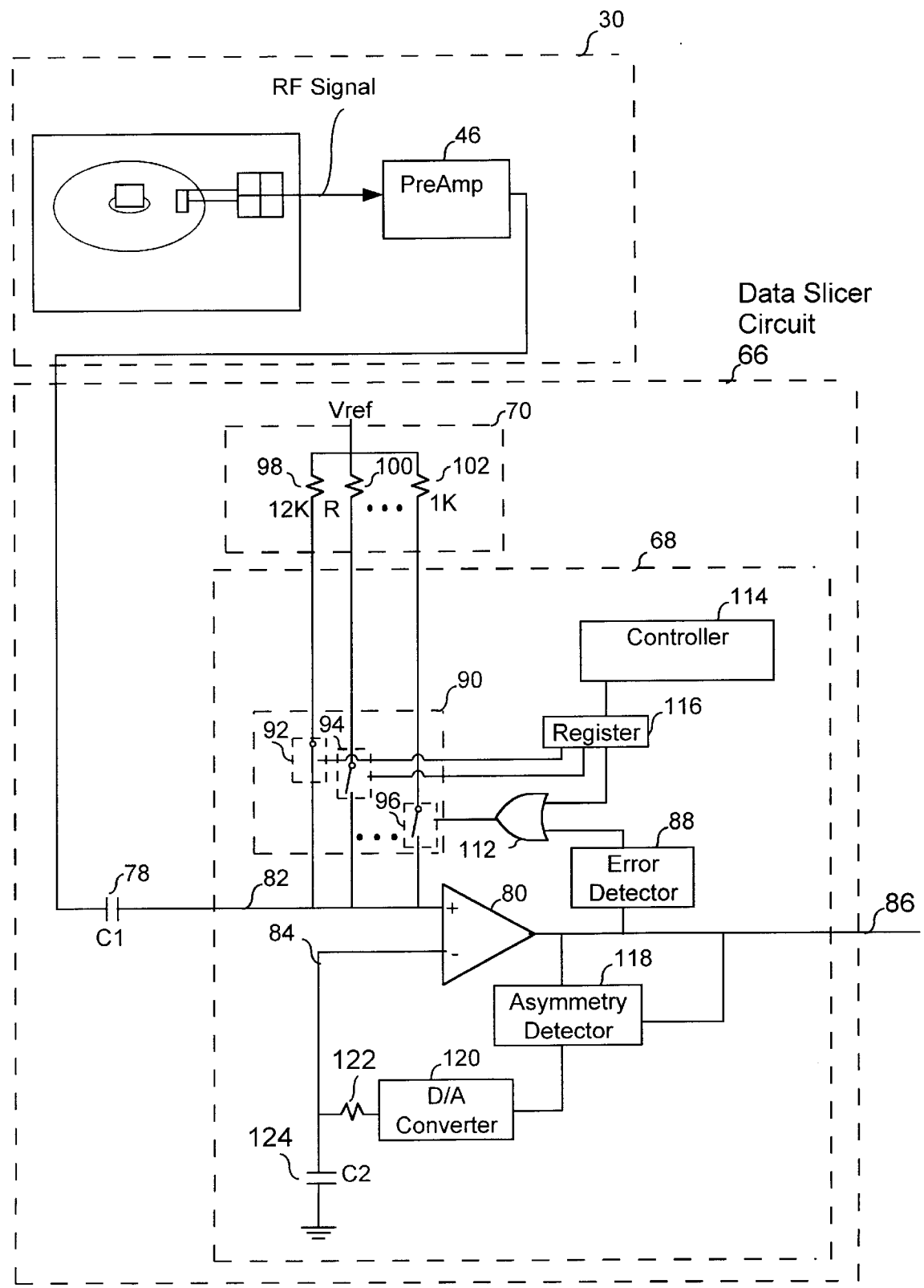
FIG. 4 illustrates a circuit receiving an analog read channel signal and outputting a digital data signal in accordance with an embodiment of the present invention.

In FIG. 4, the data slicer circuit 66 of the present invention is shown in more detail. The data slicer circuit 66 receives the read channel signal from the preamplifier 46 via capacitor (C1) 78. A comparator 80 receives the read channel signal on a positive (+) input line 82 and a reference voltage on a negative input (−) line 84. The comparator 80 compares the read channel signal to the reference voltage and outputs a digital data signal on line 86. The digital data signal has a digital high value or a digital low value depending on the result of the comparison. In this way, the comparator decodes the analog read channel signal and outputs a stream of digital high and digital low values.

A read channel error detector 88 such as a drop-out detector generates an error signal in response to an error in an analog read channel signal. The error detector 88 is an envelope detector such as a low pass filter.

Ideally the DC bias of the analog read channel signal is set by connecting the positive input line 82 to a resistor that is attached to a reference voltage. However, errors in the read channel signal may cause the DC bias to fluctuate. In those cases, the DC offset of the analog read channel signal will need to be adjusted.

To adjust the DC bias of the read channel signal, a set 90 of parallel switches 92–96 selectably include or exclude resistors 98–102, respectively. Each switch 92–96 connects in series to a resistor 98–102, respectively, and a DC voltage source. The DC voltage source is the reference voltage. A selected switch 96–96 turns on in response to the error signal to include the series resistor 98–102, respectively, in the circuit to adjust the DC offset of the analog read channel signal. In this way, the DC bias of the read channel signal is modified and the comparator outputs a digital data signal in response to the adjusted analog read channel signal.

Note that the capacitor C1 78 and the connected resistors act as a high pass filter that depends on the value of the resistor switched into the circuit.

Figure 5:
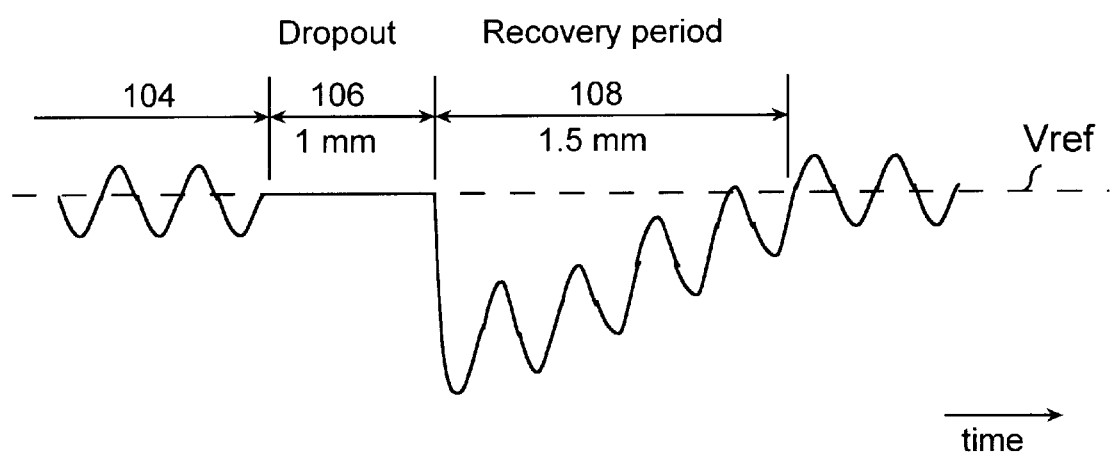
FIG. 5 illustrates a change in DC offset in the read channel because of a drop-out in the read channel signal in accordance with an embodiment of the present invention.

Referring also to FIG. 5, an exemplary dropout in the RF signal is shown. In region 104, the RF signal is normal. However, in region 106, due to contamination, such as a fingerprint, the RF signal disappears for a period of time. In this example, one millimeter of data is lost. In region 108, the RF signal returns. However, although the RF signal has transitions, the DC value of the RF signal is less than the reference voltage and remains so for a recovery period that is equivalent to about one and one-half millimeters on the disk.

Referring back to FIG. 4, typically the 12K ohm resistor 98 is switched into the circuit. To reduce the amount of time of the recovery period and reduce the amount of lost information, the present invention switches in a resistor with a lower resistance value, such as resistor 102, which has a value of 1K ohm, to allow the voltage level on line 82 to increase to the reference voltage at a higher rate.

In normal operation, the 12K ohm resistor is connected by switch 92 to the positive input line 82. When the drop-out detector 88 detects the dropout region 106 of FIG. 4, the error detector 88 outputs a digital one to OR gate 112. In response, the OR gate 112 outputs a digital one to the base of switch 96 to turn on switch 96 and include the 1K ohm resistor in the circuit. If the 1K ohm resistor has a lower resistance than those resistors 98–102 switched into the positive input line 82 of the comparator 80, then including the 1K ohm resistor reduces the resistance of the circuit and causes the DC bias level of the read channel signal to increase at a faster rate to reach the reference voltage.

To control the set of switches, a controller 114 supplies a set of digital values to a register 116. One output of the register 116 connects to the OR gate 112 to operate the switch 96. Therefore, switch 96 is activated either by the error signal control circuit 114 or the drop-out detector 88.

Another error detector, an asymmetry detector 118 detects asymmetry in the digital data signal. In response to detected asymmetry, a digital-to-analog converter 120 outputs an analog signal via a resistor 122 to the negative input line 84 of the comparator to change the voltage at the negative input line 84 of the comparator. Another capacitor C2 124 is connected between the negative input line and ground.

The asymmetry detector 118 operates on the principle that, in EFM encoding, over a long period of time, the number of clock periods having a digital one value should be equal to the number of clock periods having a digital zero value. A clock signal is derived from the digital data signal by a phase-locked-loop (PLL). The clock signal has a period T and the EFM signal has digital one and zero values for integer multiples of the clock period T. The asymmetry detector 118 is a counter and both the clock signal and the digital data signal are input to the counter to count the clock periods. In response the output of the counter, a digital-to-analog (D/A) converter 120 adjusts the voltage of the negative input line 84 of the comparator 80 to equalize the number of clock periods at the digital zero value and digital one value.

When the counter outputs a zero value, the number of clock periods having a digital one value is equal to the number of clock periods having a digital zero value. Therefore, the D/A converter 120 does not adjust the voltage of the negative input line 84 of the comparator 80.

When the counter outputs a non-zero value, the number of clock periods having a digital one value is not equal to the number of clock periods having a digital zero value. Therefore, the D/A converter 120 adjusts the voltage of the negative input line of the comparator 80.

In an alternate embodiment, the output of the asymmetry detector 118 is supplied to the error control circuit 114 which adjusts the voltage of the positive input line 82 of the comparator 80 by switching selected ones of resistors 98–102 into or out of the positive input line 82.

In this way, by including and excluding resistors in response to the error signals, the bias voltage of the read channel signal is adjusted. The invention allows for a quick response to errors by directly coupling at least one error signal to a switch. In particular, when drop-outs in the data occur, the resistor is quickly switched into or out of the circuit to reduce the offset voltage to reduce the recovery time.

Although the invention has been described with respect to a CD-ROM, the invention also applies to optical disk drives that read and write data (CD-RW). The invention is also applicable to other disk drive systems including magneto-optical and magnetic disk drives.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A circuit for converting an analog read channel signal to a digital data signal, comprising:

a read channel error detector generating an error signal in response to an error in an analog read channel signal;

a set of parallel switches, each parallel switch being connected in series to a pullup resistor and a DC voltage source, a selected parallel switch of said set of parallel switches changing state in response to said error signal so as to provide an adjusted analog read channel signal; and a comparator having a first input and a second input, said first input being coupled to said set of switches, said second input being maintained at a reference voltage, said comparator outputting a digital data signal in response to said adjusted analog read channel signal.

2. The circuit of claim 1 wherein said set of switches and said comparator are formed on an integrated circuit and said pullup resistors are external to said integrated circuit.

3. The circuit of claim 1 wherein said read channel error detector generates said error signal when said analog read channel signal has no transitions for a predetermined interval of time.

4. The circuit of claim 1 wherein said read channel error detector is an envelope detector that receives said read channel signal and generates said error signal in response to a detected envelope when said detected envelope is below a predetermined threshold voltage for a predetermined period of time.

5. The circuit of claim 1 wherein said read channel error detector generates said error signal in response to asymmetry of said read channel signal.

6. The circuit of claim 1 further comprising:

an asymmetry detector generating a digital adjustment signal in response to asymmetry in said digital data signal; and a digital to analog converter generating an analog reference voltage in response to said digital adjustment signal, wherein said analog reference voltage is said reference voltage supplied to said second input of said comparator.

7. The circuit of claim 1 further comprising:

an error signal control circuit coupled to said set of switches for enabling and disabling said switches.

8. A disk controller comprising:

a servo system generating signals to cause an actuator to position a head over a target track on a disk, said servo system also generating at least one rotation signal to cause a spindle motor to rotate said disk; and a control circuit receiving an analog read channel signal from said head and outputting a digital data signal including:

a read channel error detector generating an error signal in response to an error in said analog read channel signal, a set of parallel switches, each parallel switch being connected in series to a pullup resistor and a DC voltage source, a selected parallel switch of said set of parallel switches changing state in response to said error signal so as to provide an adjusted analog read channel signal, and a comparator having a first input and a second input, said first input being coupled to said set of switches, said second input being maintained at a reference voltage, said comparator outputting said digital data signal in response to said adjusted analog read channel signal; and a decoder receiving said digital data signal, decoding said digital data signal and outputting said decoded digital data signal onto a bus.

9. The disk controller of claim 8 wherein said set of switches and said comparator are formed on an integrated circuit and said pullup resistors are external to said integrated circuit.

10. The disk controller of claim 8 wherein said read channel error detector generates said error signal when said analog read channel signal is absent transitions for a predetermined interval of time.

11. The disk controller of claim 8 wherein said read channel error detector is an envelope detector that receives said read channel signal and generates said error signal in response to a detected envelope when the detected envelope is below a predetermined threshold voltage for a predetermined period of time.

12. The disk controller of claim 8 wherein said read channel error detector generates said error signal in response to asymmetry of the read channel signal.

13. A method for converting an analog read channel signal to a digital data signal, comprising:

generating an error signal in response to an error in an analog read channel signal;

changing a state of at least one switch of a set of parallel switches in response to said error signal to adjust said analog read channel signal so as to provide an adjusted analog read channel signal, each parallel switch being connected to a resistor and a DC voltage source; and comparing said adjusted analog read channel signal to a reference voltage to generate a digital data signal.

14. The method of claim 13 further comprising:

forming said comparator, and said set of switches on an integrated circuit; attaching said external resistors are external to said set of switches.

15. The method of claim 13 wherein said generating generates said read channel error detector when said analog read channel signal is absent transitions for a predetermined interval of time.

16. The method of claim 13 wherein said generating an error signal includes the detecting of an envelope of the analog read channel signal.

17. The method of claim 13 wherein said generating includes detecting asymmetry of said analog read channel signal.

18. The method of claim 13 wherein said generating said error signal includes generating a digital adjustment signal in response to asymmetry in said digital data signal; and further comprising:

generating an analog reference voltage in response to said digital adjustment signal, wherein said analog reference voltage is said reference voltage.

* * * * *